US011905933B2

(12) United States Patent
Buggy et al.

(10) Patent No.: US 11,905,933 B2
(45) Date of Patent: Feb. 20, 2024

(54) ELECTRO-THERMAL HEATING

(71) Applicant: VESTAS WIND SYSTEMS A/S, Aarhus N (DK)

(72) Inventors: Stephen Buggy, Cowes (GB); Luke Spandley, Ventnor (GB); Paul Badger, Salisbury (GB)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 16/063,505

(22) PCT Filed: Dec. 22, 2016

(86) PCT No.: PCT/DK2016/050463
§ 371 (c)(1),
(2) Date: Jun. 18, 2018

(87) PCT Pub. No.: WO2017/108064
PCT Pub. Date: Jun. 29, 2017

(65) Prior Publication Data
US 2019/0003463 A1    Jan. 3, 2019

(30) Foreign Application Priority Data
Dec. 23, 2015 (DK) .............................. PA201570870

(51) Int. Cl.
*F03D 80/40* (2016.01)
*F03D 17/00* (2016.01)
(52) U.S. Cl.
CPC ............. *F03D 80/40* (2016.05); *F03D 17/00* (2016.05); *F05B 2270/309* (2013.01);
(Continued)

(58) Field of Classification Search
CPC ......... F03D 80/40; F03D 17/00; B64D 15/12; B64D 15/14; F01D 25/02
See application file for complete search history.

(56) References Cited

U.S. PATENT DOCUMENTS 4,386,749 A * 6/1983 Sweet .................... B64D 15/12
244/134 D
6,145,787 A * 11/2000 Rolls ....................... B64D 15/12
219/545
(Continued)

FOREIGN PATENT DOCUMENTS

AU     2014247112 A1    9/2015
CN     102213191 A     10/2011
(Continued)

OTHER PUBLICATIONS

Chinese Office Action for Application No. 201680079031.8 dated May 8, 2019.
(Continued)

*Primary Examiner* — Topaz L. Elliott
*Assistant Examiner* — Michael K. Reitz
(74) *Attorney, Agent, or Firm* — Patterson + Sheridan, LLP (57) ABSTRACT

The present invention relates to a method and controller for heating a wind turbine blade that comprises a plurality of heating zones. An icing factor is determined based on environmental conditions and one or more heating zones are determined based on the determined icing factor, wherein each heating zone comprises one or more Electro-Thermal Heating Elements. The one or more Electro-Thermal Heating Elements corresponding to the determined heating zones are activated to generate heat.

20 Claims, 7 Drawing Sheets

(52) U.S. Cl.
CPC ..... *F05B 2270/32* (2013.01); *F05B 2270/323* (2013.01); *F05B 2270/325* (2013.01); *Y02E 10/72* (2013.01)

(56) References Cited

U.S. PATENT DOCUMENTS

| | | | |
|---|---|---|---|
| 2005/0184193 A1* | 8/2005 | Bourjac | B64D 15/12 244/10 |
| 2005/0276696 A1 | 12/2005 | LeMieux | |
| 2008/0141768 A1 | 6/2008 | Ormel et al. | |
| 2008/0181775 A1 | 7/2008 | Livingston et al. | |
| 2009/0072091 A1 | 3/2009 | Al-Khalil | |
| 2010/0119370 A1* | 5/2010 | Myhr | F03D 80/40 416/169 R |
| 2011/0038729 A1 | 2/2011 | Shymanski et al. | |
| 2013/0022465 A1 | 1/2013 | Stiesdal | |
| 2013/0022466 A1* | 1/2013 | Laurberg | F03D 80/40 416/95 |
| 2013/0026757 A1* | 1/2013 | Peters | F03D 7/0224 290/44 |
| 2013/0078093 A1* | 3/2013 | Miranda | F03D 7/0224 416/1 |
| 2013/0106108 A1 | 5/2013 | De Boer et al. | |
| 2013/0177416 A1 | 7/2013 | Renschler et al. | |
| 2015/0023792 A1 | 1/2015 | Spitzner et al. | |
| 2015/0204311 A1 | 7/2015 | Clemens | |
| 2015/0260047 A1* | 9/2015 | Gieras | B64D 15/12 416/95 |
| 2015/0303369 A1* | 10/2015 | Haden | H01L 41/042 416/39 |
| 2016/0025069 A1 | 1/2016 | Hilling | |
| 2016/0084231 A1* | 3/2016 | Runge | F03D 7/00 416/1 |
| 2016/0130006 A1* | 5/2016 | Brouwers | H05B 1/0236 416/1 |
| 2016/0312767 A1* | 10/2016 | Wilson | F03D 9/25 |
| 2017/0022975 A1* | 1/2017 | De Boer | F03D 9/257 |
| 2017/0226990 A1* | 8/2017 | Arlaban Gabeiras | F03D 17/00 |

FOREIGN PATENT DOCUMENTS

| | | | |
|---|---|---|---|
| CN | 103277265 A | 9/2013 | |
| CN | 105190027 A | 12/2015 | |
| DE | 102013206039 A1 | 10/2014 | |
| EP | 1748185 A1 | 1/2007 | |
| EP | 2626557 A1 | 8/2013 | |
| EP | 2826993 A1 | 1/2015 | |
| KR | 101422707 B1 | 7/2014 | |
| WO | 9853200 A1 | 11/1998 | |
| WO | 2004057182 A1 | 7/2004 | |
| WO | 2010/028653 A2 | 3/2010 | |
| WO | WO-2013091642 A1 * | 6/2013 | ............ F03D 80/40 |
| WO | 2014074034 A1 | 5/2014 | |
| WO | 2017108064 A1 | 6/2017 | |

OTHER PUBLICATIONS

PCT Written Opinion of the International Searching Authority for Application No. PCT/DK2016/060463 dated Dec. 12, 2016.
PCT International Search Report for Application No. PCT/DK2016/050463 dated Dec. 22, 2016.
Danish First Technical Examination for Application No. PA 2015 70870 dated Jun. 24, 2016.
PCT Written Opinion of the International Searching Authority for Application No. PCT/DK2016/050463 dated Apr. 21, 2017.
PCT International Search Report for Application No. PCT/DK2016/050463 dated Apr. 21, 2017.
European Patent Office, Communication of a notice of opposition for European Patent Application No. 16826286.3-1002/3394439, dated Nov. 8, 2022.

* cited by examiner

ELECTRO-THERMAL HEATING

The present invention relates to Electro-Thermal Heating (ETH) and in particular to an improved control of ETH for Wind Turbine Blades.

Wind turbines generate electrical power from wind energy and can be situated on land or off-shore. Wind turbines situated in cold climates can suffer from icing events where ice may be formed on the surface of the wind turbine blades due to freezing water on the cold surface. The accumulation of ice on the surface of a blade can result in undesirable consequences. For example, a change in the profile of the wind turbine blades due to the accumulation of ice may reduce the speed of rotation of the wind turbine. As a result, the wind turbine may operate below optimal speed and efficiency which degrades the performance of the wind turbine. Also, the additional weight of the accumulating ice on the wind turbine blades may cause fatigue and stress failures of the blades.

Therefore, there is a need to be able to prevent or reduce the effects of icing on the blades of a wind turbine in order to prevent damage to the blades and also to increase the performance of a wind turbine.

Various systems and methods have been described to either, or both, to de-ice (e.g. remove ice accumulated) a wind turbine or to provide anti-icing (e.g. prevent ice from accumulating) for a wind turbine.

For example, hot-air de-icing systems provide the capability to de-ice the wind turbine blades to effectively remove ice once the ice accumulates by providing hot air inside the blade to increase the surface temperature of the blade.

It is also known to attach heating mats to the wind turbine blades which when supplied with electrical power generate heat to increase the surface temperature of the surface of the blade. Such heating mats may be used for either or both of anti-icing or de-icing of the wind turbine blade.

In relation to Electro-Thermal Heating systems it is difficult and problematic to control the Electro-Thermal Heating to provide sufficient heat to the blade structure in order to prevent or reduce ice accretion on wind turbine blades.

The present invention seeks to address, at least in part, the problems and disadvantages described hereinabove and to seek to provide an improved control system for Electro-Thermal Heating of a wind turbine blade that sufficiently and effectively heat the blade surface in differing environmental conditions in an efficient manner.

STATEMENT OF INVENTION

According to a first aspect of the present invention there is provided a method of heating a wind turbine blade comprising a plurality of heating zones, the method comprises the steps of: determining an icing factor based on environmental conditions; determining one or more heating zones to activate based on the determined icing factor, wherein each heating zone comprises one or more Electro-Thermal Heating Elements; and activating the one or more Electro-Thermal Heating Elements corresponding to the determined heating zones to generate heat.

Therefore, the present invention advantageously provides an efficient and effective an Electro-Thermal Heating system that can direct heating to zones of a wind turbine blade.

The icing factor may be determined based on one or more of ambient air temperature, liquid water content of the air, wind speed, rate of degradation of a power curve, change in blade modal frequency, change in blade mass, change in blade deflection, or blade surface sensors.

The icing factor may be determined continuously or may be determined at predetermined intervals.

The method may further comprise monitoring one or more environmental conditions and/or operating parameters; comparing the one or more environmental conditions and/or operating parameters to threshold criteria; and triggering the determination of the icing factor if the threshold criteria are satisfied.

The method may further comprise overriding the triggering of the determination of the icing factor based on measured wind conditions.

Determining the one or more heating zones may further comprise identifying one or more heating zones that provides a greater aerodynamic performance based on the icing factor.

The aerodynamic performance may vary along the length of a wind turbine blade; and wherein the aerodynamic performance is a percentage contribution to the power generated by a wind turbine.

The method may further comprise determining a power level to supply to the determined one or more zones based on the determined icing factor. The determined power level may be a percentage of the total available power.

The method may further comprise determining a duty cycle for activating the Electro-Thermal Heating elements of the determined one or more heating zones, based on the determined icing factor. The method may further comprise identifying a percentage of the duty cycle for activating the Electro-Thermal Heating elements for each of the determined one or more heating zones.

The method may further comprise activating the Electro-Thermal Heating elements of the determined one or more heating zones, based on the determined duty cycle.

The icing factor may indicate a severity of an icing event. As the icing factor improves the determined number of heating zones may increase.

According to a second aspect of the present invention there is provided a controller for controlling heating of a wind turbine blade comprising a plurality of heating zones, the controller being adapted to: determine an icing factor based on environmental conditions; determine one or more heating zones to activate based on the determined icing factor, wherein each heating zone comprises one or more Electro-Thermal Heating Elements; and activate the one or more Electro-Thermal Heating Elements corresponding to the determined heating zones to generate heat.

The controller may be adapted to determine the icing factor based on at least ambient air temperature, liquid water content of the air and wind speed.

The controller may be adapted to determine the icing factor continuously or at predetermined intervals.

The controller may be further adapted to monitor one or more environmental conditions and/or operating parameters; compare the one or more environmental conditions and/or operating parameters to threshold criteria; and trigger the determination of the icing factor if the threshold criteria are satisfied. The controller may be further adapted to override the triggering of the determination of the icing factor based on measured wind conditions.

The controller may be further adapted to identify one or more heating zones that provide a greater aerodynamic performance based on the icing factor.

The controller may be further adapted to determine a power level to supply to the determined one or more zones based on the determined icing factor.

The controller may be further adapted to determine a duty cycle for activating the Electro-Thermal Heating elements of the determined one or more heating zones, based on the determined icing factor. The controller may be further adapted to identify a percentage of the duty cycle for activating the Electro-Thermal Heating elements for each of the determined one or more heating zones.

The controller may be further adapted to activate the Electro-Thermal Heating elements of the determined one or more heating zones, based on the determined duty cycle.

The controller may be adapted to perform any functions or features of the method of the present invention described herein.

The controller may comprise one or more processors and memory and may be located in the wind turbine nacelle, hub, or blade. The controller may be adapted or configured via hardware, software or any combination thereof.

According to a third aspect of the present invention there is provided a wind turbine comprising a controller described herein.

According to a fourth aspect of the present invention there is provided a computer program product comprising computer readable executable code for performing any or all of the functions and/or features in accordance with the aspects of the invention.

DESCRIPTION OF THE FIGURES

The embodiments of the present invention will now be described, with reference to the accompanying Figures, in which.

DESCRIPTION OF THE EMBODIMENTS

Figure 1:
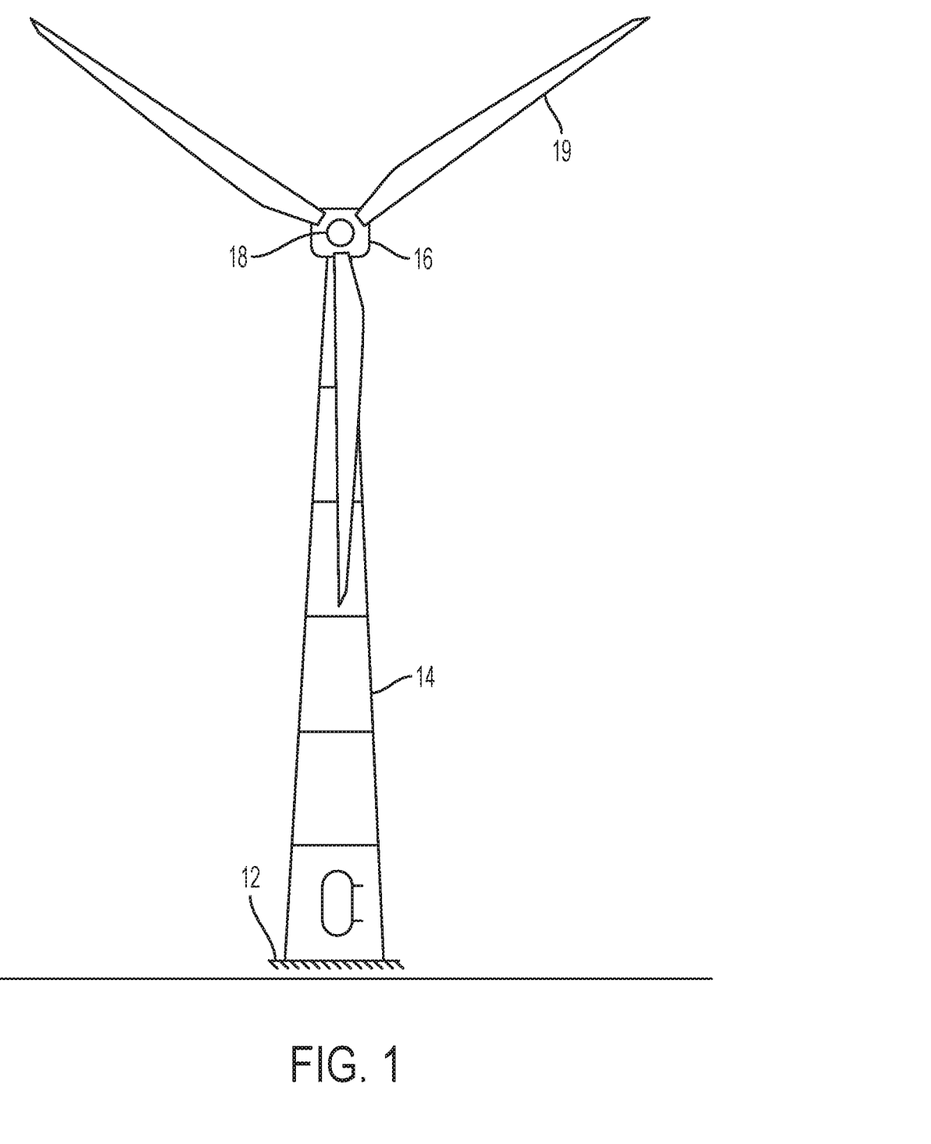
FIG. 1 shows a schematic of a wind turbine according to one or more embodiments of the present invention.

FIG. 1 shows a schematic of a typical wind turbine 10 which includes embodiments of wind turbine blades 20 according to the present invention. The wind turbine 10 is mounted on a base 12 which may be onshore foundations or off-shore platforms or foundations. The wind turbine includes a tower 14 having a number of tower sections. A nacelle 16 is located and attached to the top of tower 14. A wind turbine rotor, connected to the nacelle 16, includes a hub 18 and at least one wind turbine blade 20, where in FIG. 1 three wind turbine blades are shown although any number of wind turbine blades 20 may be present depending on the design and implementation of the wind turbine 10. The wind turbine blades 20 are connected to the hub 18 which in turn is connected to the nacelle 16 through a low speed shaft which extends out of the front of the nacelle 16.

Figure 2:
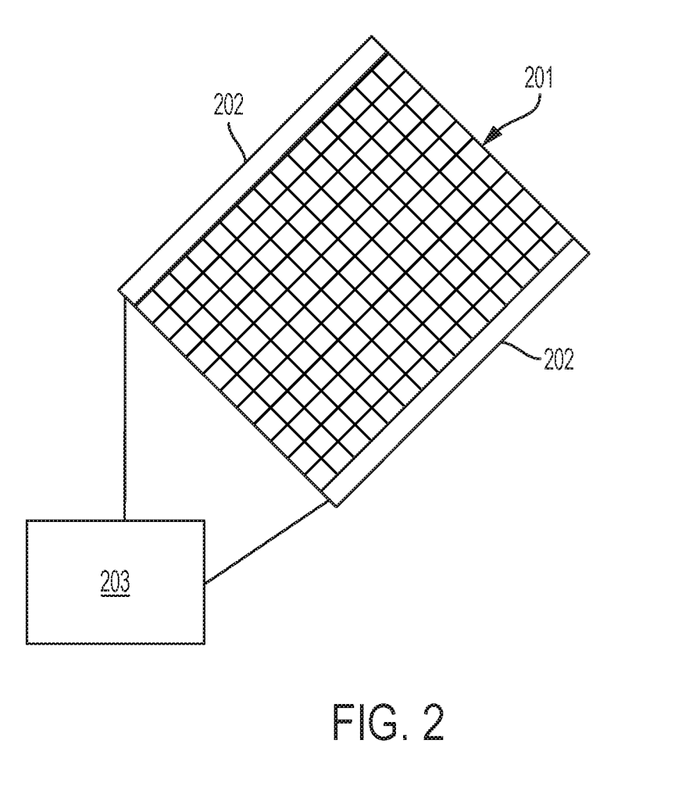
FIG. 2 shows a schematic of an Electro-Thermal Heating Element according to one or more embodiments of the present invention.

FIG. 2 shows a schematic of an Electro-Thermal Heating (ETH) element 201 which may be embedded within a wind turbine blade structure.

The ETH element(s) 201 may be formed of any suitable material and construction which generates heat once supplied with electrical power. For example, the ETH elements may be formed of a glass fibre mat coated with carbon. However, any form, type, material or construction of a heating mat suitable for heating a wind turbine blade may be utilized.

There may be a single embedded ETH element 201 covering at least a portion of the wind turbine blade 200, or there may be a plurality of embedded ETH elements 201 covering at least a portion of the wind turbine blade 200. Alternatively or additionally, there may be one or more ETH elements located on the outer surface of the blade.

In the case of a single ETH element, the single ETH element may comprise a plurality of zones which can be individually or collectively activated to generate heat across different areas of the blade surface. In order to generate different levels of heat in one or more different zones, power is coupled or connected to the ETH element at predetermined locations to define the predetermined zones. The different predetermined zones may also have different characteristics or properties in order to provide different levels of heat when activated. For example, the characteristics or properties may include one or more of different dimensions (width, height, and or depth), different resistances, different concentrations of carbon, and/or different concentration of glass fibre.

In the case of a plurality of ETH elements 201, which are embedded within the blade structure and covering at least a portion of the blade, the ETH elements may be arranged in a patchwork structure creating a plurality of predetermined zones covering predefined areas of the blade structure. Each ETH element 201 embedded within the blade structure may have different characteristics or properties in order to provide different levels of heat when activated. For example, the characteristics or properties may include one or more of different dimensions (width, height, and or depth), different resistances, different concentrations of carbon, and/or different concentration of glass fibre.

The ETH element 201 embedded within the structure of the blade may be connected to an electrical power supply 203 via contacts 202 to enable the supply if power to the ETH element 201 in order to generate heat within the ETH element 201 which in turn increases the surface temperature of the blade directly above and near to the location of the ETH element 201.

The electrical power supply 203 to the plurality of ETH elements or to a single ETH element may be located in the wind turbine blade, or in a rotor/hub to which the blade is attached, or in the nacelle of the wind turbine.

In order to efficiently and effectively heat the blade surface, the heating is directed to specific and predetermined zones of the blade surface based on at least an icing factor that is determined from at least one or more environmental conditions.

Depending on the severity of an icing event (e.g. past icing event, current icing event, or an expected icing event) it has been identified that predetermined zones of the blade surface should be subject to anti-icing in order to efficiently anti-ice the blade and to increase the aerodynamic performance of the blade in strategically and aerodynamically important areas.

Figure 3:
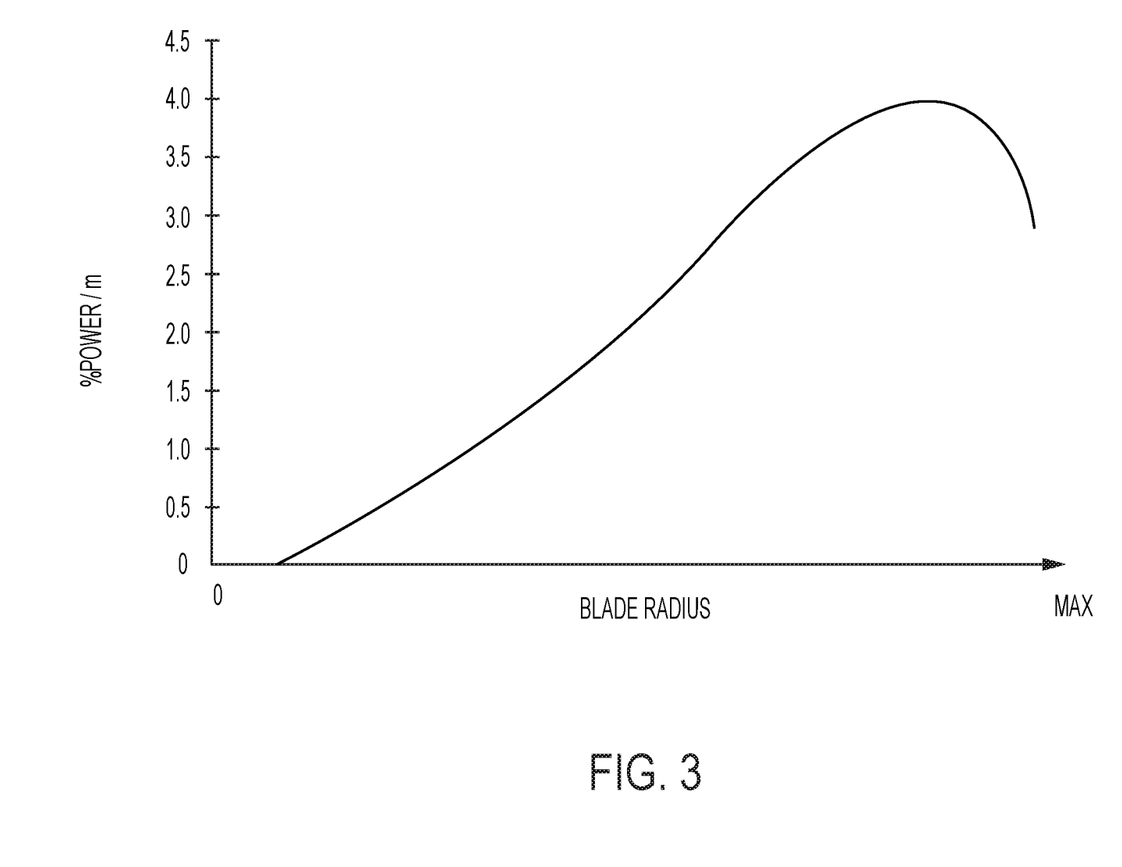
FIG. 3 shows an example of a typical aerodynamic performance profile of a wind turbine blade.

For example, and with reference to FIG. 3, it has been identified that the aerodynamic performance of a blade is most affected by a region towards the tip of the blade. FIG. 3 is a schematic example of a typical blade aerodynamic performance where the Y-axis is the contribution to the power generated and the X-axis is the blade radius increasing from the root to the tip. In the example shown in FIG. 3, an area towards the tip of a typical blade contributes the highest percentage of power generated. Therefore, during a severe icing event it has been identified that it is most effective to anti-ice this area of the blade in order to have the greatest impact on the aerodynamic performance of the blade in terms of generating power.

The abovementioned icing factor may be determined using at least one environmental parameter and/or wind turbine parameter. For example, the parameters may include one or more of temperature, air liquid water content, air humidity, air pressure, wind speed, rotor speed, power generated, blade load measurements, wind estimators, and so on.

The icing factor may be a scale of 0 to 10 where a value of 0 indicates no icing event through to a value of 10 which indicates a severe icing event, or vice versa. However, as will be appreciated, any suitable scale may be used, e.g. 0 to 20, 0 to 50, 0 to 100, and so on.

Accordingly, a simple method to determine the icing factor may be dependent or based on the air temperature at or near to the wind turbine. The air temperature may be divided into 11 temperature bands that correspond to a scale of 0 to 10 of the icing factor.

Another method of determining the icing factor may comprise using the wind speed, air liquid water content and air temperature at or near to the wind turbine or within the wind turbine park. The wind speed may be measured directly, e.g. via an anemometer, or indirectly, e.g. based on the rotational speed of the rotor, via a wind estimator, and so on.

There may be several different methods for determining an icing factor which may be used separately or in any combination in order to identify or determine an icing factor for the control of the ETH elements. Other methods may include determining the rate of change of the degradation of the power curve for a wind turbine, e.g. if the rate of change of degradation of the power generated by the wind turbine increases then the icing factor increases so that the icing factor is determined based on the rate of change of the degradation of the power curve. Determining a difference or error signal between the measured rotor speed compared to the expected rotor speed for a given wind speed, where the greater the difference or error signal the greater the icing factor is determined to be. The icing factor may be additionally or alternatively determined based on a change in blade modal frequency, change in blade mass, or change in blade deflection The icing factor may be determined continuously or at predefined intervals, or triggered to be determined once one or more predefined conditions are met.

In one example, the method for determining the icing factor is triggered or activated once one or more certain predefined conditions or criteria are met. Such predefined conditions may be the season of the year (e.g. winter, spring, summer or autumn), where the determination of the icing factor is triggered in the seasons where ice can be expected. The predefined condition may be the month of the year, where the determination of the icing factor is triggered in the months where ice can be expected. The predefined condition may be the air temperature, for example, when the air temperature falls below a threshold of, e.g. 2 degrees centigrade, then the determination of the icing factor can be triggered. The predefined condition may be based on the power curve so that when the power curve degrades by, or falls below, a threshold then the determination of the icing factor can be triggered. Any suitable predefined condition may be set to trigger the determination of the icing factor that is suitable for the purpose, for example, indicates that icing may be affecting the wind turbine. Several example predefined conditions have been described hereinabove and the trigger may be based on any one or any combination of the described predefined conditions.

Whether the predefined conditions have been met to trigger the determination of the icing factor may be determined continuously or at predefined intervals. For example, the determination of the trigger conditions may be made every 10 minutes, 30 minutes, hour, and so on. As a person skilled in the art will appreciate that any suitable predefined interval may be set for checking whether the trigger conditions have been met.

It may also be useful to be able to override the triggering of the determination of the icing factor. For example, if the conditions are below the minimum threshold for the wind turbine to operate then there is no need to determine the icing factor as the wind turbine will be shut down. Another example for overriding the trigger is if the wind is below the minimum cut-in wind speed for the wind turbine as the wind turbine would not be able to operate even if the ice was prevented from forming on the blades.

Once the trigger conditions have been met then an icing factor is determined, as described hereinabove. The icing factor may then be re-determined or updated continuously, or at predefined intervals, in order to track and evaluate the icing event. For example, the icing factor may be updated or determined every second, 5 seconds, 10 seconds, 30 seconds, minute, 5 minutes, 10 minutes, and so on. As the icing factor may change relatively quickly based on the environmental conditions, wind turbine conditions, and/or the heating of the blades via the ETH elements, then the determination of the icing factor should be at a relevantly high frequency.

Figure 4:
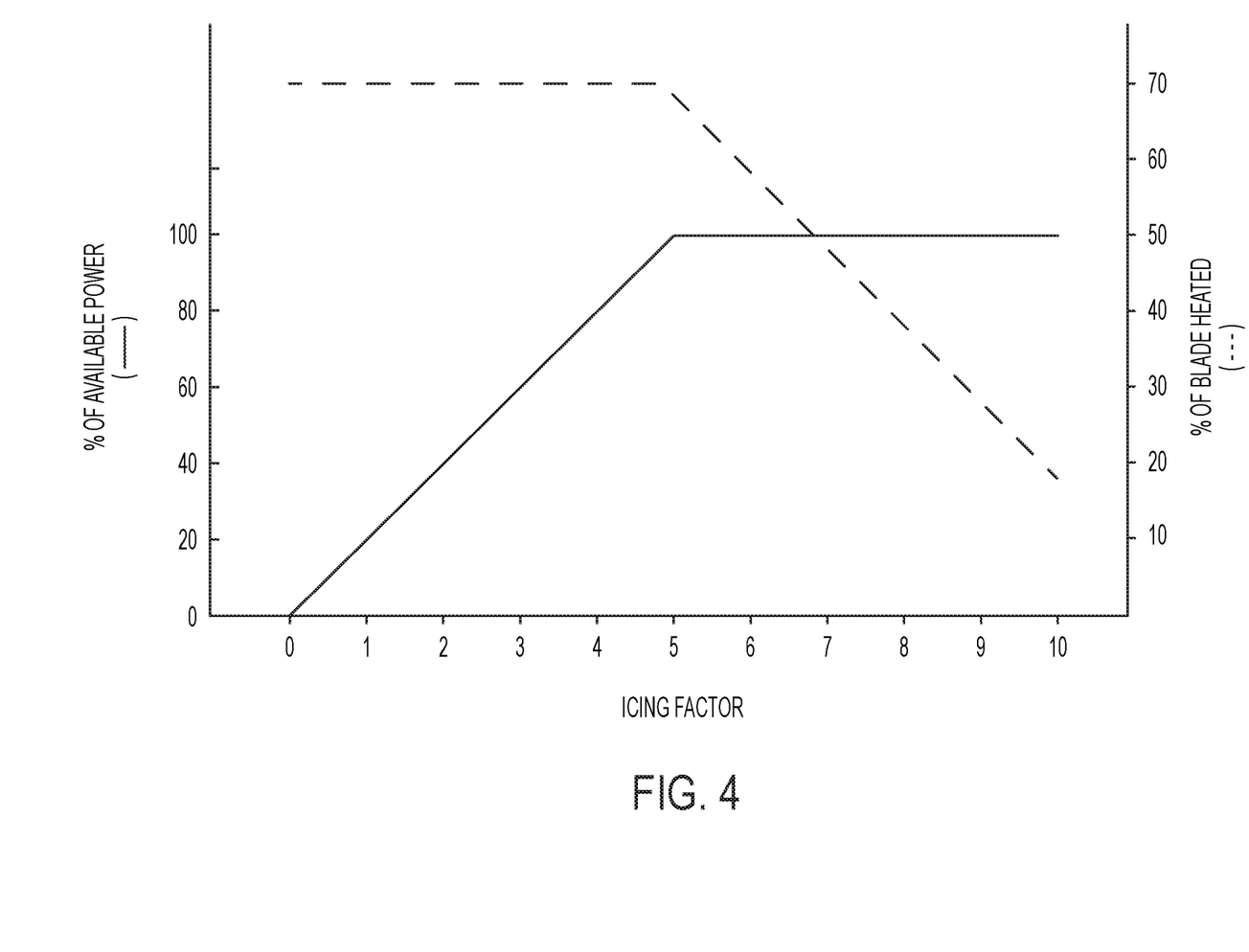
FIG. 4 shows an example determination of blade heating area and power levels based on an icing factor according to one or more embodiments of the present invention.

With reference to FIG. 4, once the icing factor has been determined it is used to determine at least an area or zone of the blade at which the corresponding ETH elements 201 will be activated. The icing factor may also be used to additionally determine the percentage of available power to provide to the ETH elements that are to be activated, as will be described further below.

For example, as can be seen in FIG. 4, if the icing factor is determined to be 10 (e.g. a severe icing event) then it is determined that the efficient and effective area of the blade to heat is 20% of the blade. With reference to FIG. 3, this 20% area of the blade corresponds to a 20% area of the blade that affects or provides the greatest aerodynamic performance for the blade, on both the leeward and windward sides of the blade.

Figure 5A:
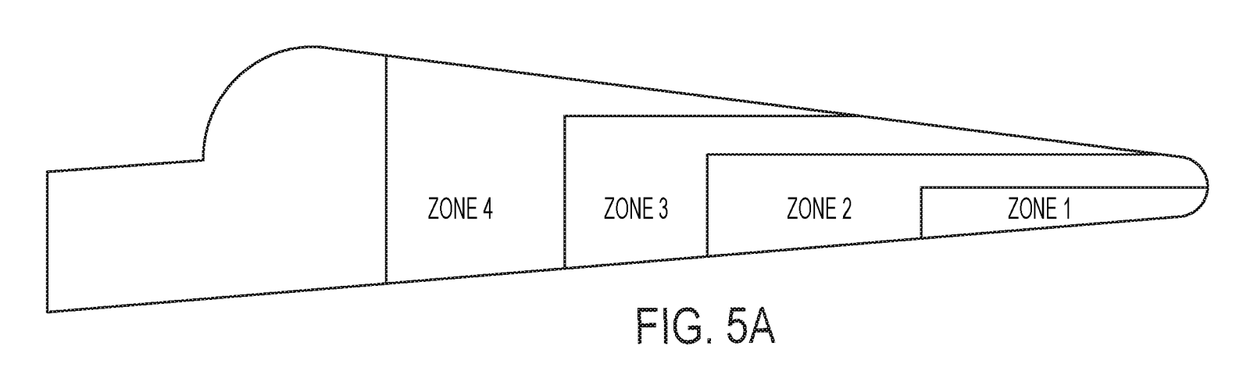
FIGS. 5a to 5c show a schematic of different heating zones according to one or more embodiments of the present invention.
Figure 5B:
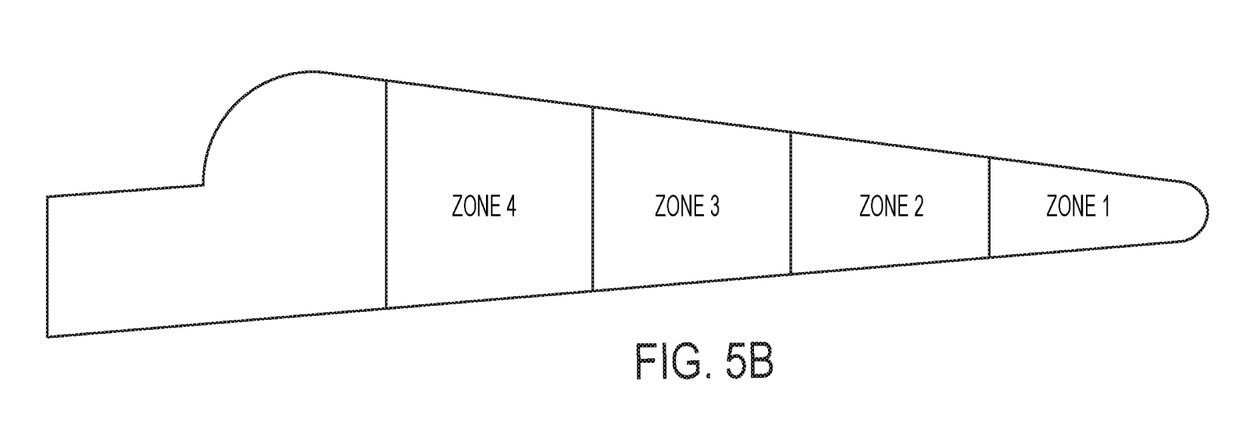
Figure 5C:
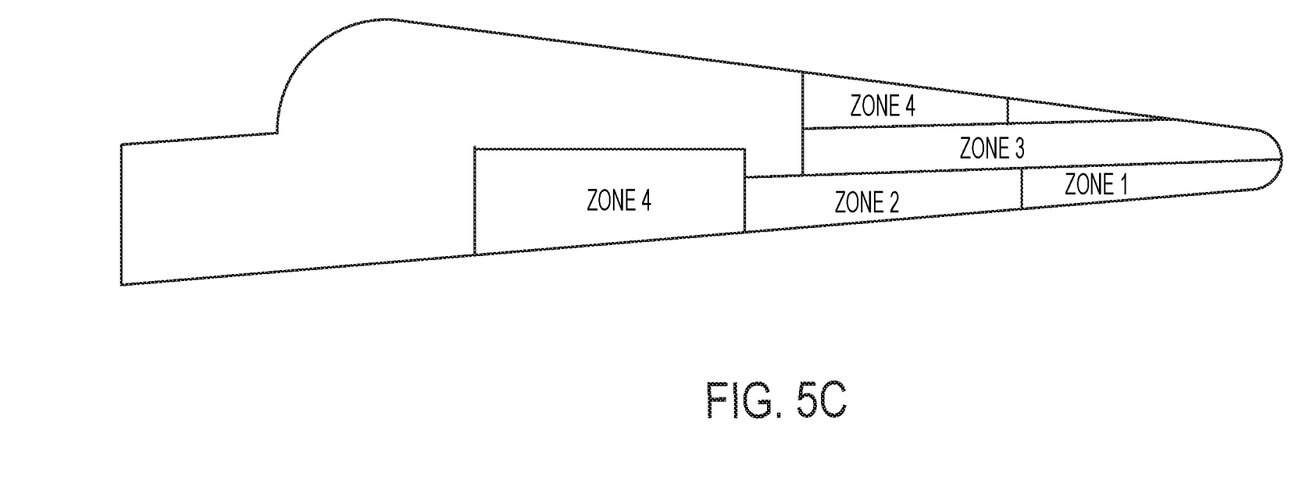

FIGS. 5a to 5c each show a schematic of different arrangements of four zones defined on a blade. In the example of an embedded plurality of ETH elements forming the zones, each zone may contain a number of ETH elements. Each schematic in FIGS. 5a to 5c are of the Leeward side of the blade structure where an identical arrangement of zones and ETH elements will be provided on the Windward side of the blade. In these examples, each zone comprises four ETH elements; however as will be appreciated there may be any number of ETH elements within each zone and that the number of ETH elements in each zone may vary.

Accordingly, in this example the area of the blade corresponding to the 20% which provides the greatest aerodynamic performance for the blade is shown as zone 1 in FIGS. 5a to 5c.

Thus, if the icing factor is determined to be a 10, relating to a severe icing event, then the ETH elements within zone 1 are activated in order to heat the blade structure in this area of the blade.

Referring to FIG. 4, if the icing factor is determined to be, for example, a value of 8 then it is determined that the efficient and effective area of the blade to heat is 40% of the blade. With reference to FIG. 3, this 40% area of the blade corresponds to the 40% area of the blade that affects or provides the greatest aerodynamic performance. With reference to FIGS. 5a to 5c, the area of the blade corresponding to the 40% which provides the greatest aerodynamic performance for the blade is shown as a combination of zone 1 and zone 2.

Thus, if the icing factor is determined to be an 8 then the ETH elements within zone 1 and zone 2 are activated in order to heat the blade structure in this area of the blade.

Referring to FIG. 4, if the icing factor is determined to be, for example, a value of 6 then it is determined that the efficient and effective area of the blade to heat is 60% of the blade. With reference to FIG. 3, this 60% area of the blade corresponds to the 60% area of the blade that affects or provides the greatest aerodynamic performance. With reference to FIGS. 5a to 5c, the area of the blade corresponding to the 60% which provides the greatest aerodynamic performance for the blade is shown as a combination of zone 1, zone 2 and zone 3.

Thus, if the icing factor is determined to be a 6 then the ETH elements within zone 1, zone 2 and zone 3 are activated in order to heat the blade structure in this area of the blade.

Referring to FIG. 4, if the icing factor is determined to be, for example, a value of 4 then it is determined that the efficient and effective area of the blade to heat is 70% of the blade. With reference to FIG. 3, this 70% area of the blade corresponds to the 70% area of the blade that affects or provides the greatest aerodynamic performance. With reference to FIGS. 5a to 5c, the area of the blade corresponding to the 70% which provides the greatest aerodynamic performance for the blade is shown as a combination of zone 1, zone 2, zone 3 and zone 4.

Thus, if the icing factor is determined to be a 4 then the ETH elements within zone 1, zone 2, zone 3 and zone 4 are activated in order to heat the blade structure in this area of the blade.

Table 1 below shows the zones activated based on the icing factor for each blade. Where "On" indicates that the zone is to be activated and "Off" indicates that the zone is not activated.

| Icing Factor | Zone 1 | Zone 2 | Zone 3 | Zone 4 |
| --- | --- | --- | --- | --- |
| 10 | On | Off | Off | Off |
| 9 | On | On | Off | Off |
| 8 | On | On | Off | Off |
| 7 | On | On | On | Off |
| 6 | On | On | On | Off |
| 5 | On | On | On | On |
| 4 | On | On | On | On |
| 3 | On | On | On | On |
| 2 | On | On | On | On |
| 1 | On | On | On | On |
| 0 | Off | Off | Off | Off |

Accordingly, based on the icing factor the area of the blade, e.g. the zones, that are to be subject to heat and anti-icing can be determined based on a lookup table, stored for example in a memory. Accordingly, the advantageous control system of the present invention may target the areas of the blade structure that are strategically and aerodynamically important to the blade in terms of generating power. During severe icing events the heating of the blade is directed at the area of the blade that provides the greatest or optimal aerodynamic performance. As the icing severity reduces, e.g. the icing factor reduces, then the control system heats more of the blade so that the heat "spreads" out over the blade structure which is more efficient and effective.

It has also been identified that the amount of power needed to activate the ETH elements may also be varied based on the severity of the icing event, and can therefore also be based upon the determined icing factor.

With reference to FIG. 4, the icing factor may also be used to determine the amount of available power (for example in terms of a percentage) to supply to the ETH elements at, or corresponding to, the determined area/zones of the blade.

As can be seen from FIG. 4, for an icing factor between 5 and 10, 100% of the available power will be supplied to the ETH elements within the determined zones that are to be heated. However, for an icing factor of 4 or less it has been advantageously identified that in order to sufficiently heat the blade structure in order to prevent or substantially reduce the occurrence of ice on the blades at the given severity of the icing event, less than the maximum available power would be sufficient. For example, at an icing factor of 4 it has been identified that only 80% of the available power is required to sufficiently heat the blade structure to prevent or substantially reduce the occurrence of ice.

Accordingly, by reducing the amount of power used by the anti-ice system, a more efficient and effective use of the available power is achieved.

The Anti-Icing control system will preferably act independently of the wind turbine control system. Accordingly, the control of the anti-icing system will not require interaction with the wind turbine controller and will have minimal impact on the wind turbine. For these reasons the anti-icing control system is preferably designed to be housed in the root of each blade, or in the hub of the wind turbine, and be a "plug and play" connection to the available power system.

The Anti-Icing control system actively controls the power distribution to the ETH elements via a bank of relays wherein the relays are individually controlled by the control system. The relays are switched on and off for the individual ETH elements and/or zones based on the determined ETH elements to activate and the determined amount of power to be supplied.

By determining the area of the blade to be subject to heating and/or the amount of power to be supplied to the ETH elements or zones corresponding to the determined area, each blade can be effectively and efficiently subjected to anti-icing. This control scheme for the anti-icing system is advantageously more effective and efficient than simply repeating a heating sequence, such as from the tip to the root of the blade.

As the anti-ice system may operate whilst the wind turbine is in operation then the amount of power available to be supplied to the ETH elements in each blade is effectively limited by the available power over the slip rings. The slip rings for a wind turbine are standard and known in the art and so a detailed description of the slip rings is not included. As a brief overview, the slip rings provide power lines and control signal lines to pass between the static nacelle and the rotating hub to ensure that components in the hub are able to receive both power and control signals. The power available to pass through the slip rings is effectively limited by the physical constraints, e.g. the physical size and dimensions of the slip rings and cables.

In an ideal situation all of the ETH elements on the blade should be switched on continuously to anti-ice the blade. However, this would require a significant amount of power to be supplied to all of the ETH elements continuously which will typically be significantly in excess of the electrical power that can be drawn across the wind turbine slip rings or is available to the anti-ice system.

Accordingly, the amount of power available to energise the ETH elements is restricted to a finite value by the slip ring capacity and also by the cables from the slip ring. To maximize the potential of the anti-icing system it has been advantageously identified that the available power which can be transmitted or drawn across the slip rings should be utilized as efficiently as possible during anti-icing.

Accordingly, this finite amount of available power needs to be effectively and efficiently shared or distributed between the ETH elements to be activated to generate sufficient heat in the blade structure.

Therefore, the control system may, for example, utilise duty cycling or a switching cycle (e.g. switching on and off relays over a period of time) to achieve power distribution across the ETH elements integrated and embedded within the blade.

Once the zones of the blade to be subject to anti-icing has been determined based on the icing factor and the amount of power to supply to the corresponding ETH elements has been determined then the ETH elements corresponding to the zones are activated by supplying the determined electrical power.

In the example given above of a severe icing condition (e.g. an icing factor of 10), zone 1 was determined as the area of the blade to heat with 100% of the available power. In this example, the power requirements to activate the number and/or type of ETH elements in zone 1 substantially match the available power that can be provided over the slip rings of the wind turbine. Therefore, whilst the icing factor is a 10, all the ETH elements in zone 1 are supplied with power for 100% of the duty cycle.

As the icing conditions begin to improve, e.g. the ambient temperature and/or blade surface temperature gets warmer, the determined icing factor reduces in value. As the icing factor reduces in value then more zones will start to be heated, such that the heating effect is advantageously spreading across the blade during a duty cycle.

For example, as described hereinabove, for an icing factor of 8, both zones 1 and 2 are determined to be activated using 100% of the power. In this example, zone 1 is powered for 50% of the duty cycle and zone 2 is power for 50% of the duty cycle.

For each of the icing factors there is predetermined a percentage of the duty cycle for each defined zone on the blade, along with the percentage of the available power used, which are shown in Table 2 below.

| Icing Factor | Zone 1 | Zone 2 | Zone 3 | Zone 4 | Percentage of Available Power |
|---|---|---|---|---|---|
| 10 | 100 | 0 | 0 | 0 | 100 |
| 9 | 70 | 30 | 0 | 0 | 100 |
| 8 | 50 | 50 | 0 | 0 | 100 |
| 7 | 40 | 40 | 20 | 0 | 100 |
| 6 | 35 | 35 | 30 | 0 | 100 |
| 5 | 25 | 25 | 25 | 25 | 100 |
| 4 | 20 | 20 | 20 | 20 | 80 |
| 3 | 15 | 15 | 15 | 15 | 60 |
| 2 | 10 | 10 | 10 | 10 | 40 |
| 1 | 5 | 5 | 5 | 5 | 20 |
| 0 | Off | Off | Off | Off | 0 |

The percentage of each duty cycle that each zone is powered shown in Table 2 is an example and as a skilled person in the art will appreciate, the percentages can be any value that is suitable and appropriate for the purpose of anti-icing the blade. For example, for icing factor of 8 in Table 2 the percentages of the duty cycle are given as 50% zone 1 and 50% zone 2, where it could be 60% zone 1 and 40% zone 2, or 55% zone 1 and 45% zone 2, and so on.

Accordingly, during operation the anti-ice control system will achieve power distribution to individual ETH elements by duty cycling the power, i.e. 100% means supplying constant power to a panel, 50% means cycling the power to a panel for a nominal time unit, e.g. 1 second on and 1 second off. In one example, the duty cycle may be for 20 seconds, and from Table 2 for an icing event of 9, zone 1 is activated for 70% of the duty cycle, i.e. 14 seconds, and zone 2 is activated for 30% of the duty cycle, i.e. 6 seconds. The duty cycle may be 10 seconds and so in the example of an icing factor of 9, zone 1 would be activated for 7 seconds and zone 2 for 3 seconds. As will be appreciated the duty cycle may be predefined as any suitable time period. The respective zones may be activated continuously or interleaved. In the examples, the respective zones are activated continuously for their percentage of the duty cycle as this reduces the wear on the relay switches controlling the supply of power to the ETH elements.

The anti-ice control system will therefore distribute the power across the ETH elements by duty cycling in order to maximize the use of the available and determined power. By controlling the zones with duty cycling then it advantageously enables more zones to be heated simultaneously during the duty cycle and enables the generated heat to spread out over the blade as the icing factor reduces.

Figure 6:
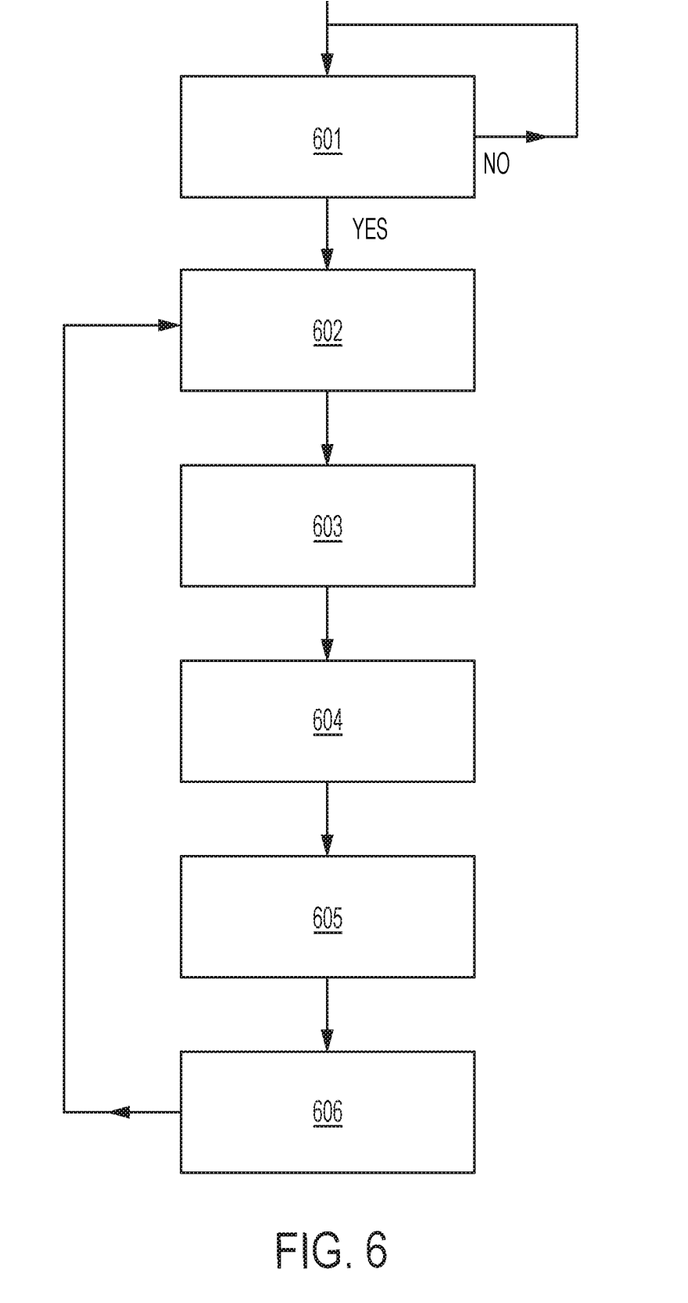
FIG. 6 is an example flow chart of a control method according to one or more embodiments of the present invention.

FIG. 6 is a flow chart that shows an example control method for the anti-icing system. In step 601 it is determined whether a trigger condition has been met. If a trigger condition is met then in step 602 an icing factor is determined. Based on the icing factor, the zones are determined in step 603, the percentage of available power to use is determined in step 604 and the duty cycle is determined in step 605. In step 606 the ETH elements in the determined zones are activated with the determined percentage of available power and for the determined duty cycle.

The present invention therefore advantageously enables more efficient and effective ant-icing by intelligently controlling the ETH elements activated and the power supplied based on an icing factor. The heating zones advantageously enable heat to be directed at aerodynamically important areas of the blade, for example, in a severe icing event the heating zones corresponding to the area of the blade that provides the greatest aerodynamic performance can be activated. As the severity of the icing event improves, e.g. reduces, then the heating of the blade can be spread out over the blade in an efficient and effective manner.

The anti-ice control system is advantageously independent of the turbine control system and is capable of distributing power to individual ETH elements by pre-programmed operating modes wherein the control system may be configurable to allow different ETH elements and/or zones to be activated individually and alter the pre-programmed operating modes.

The examples and embodiments described above are for example purposes only, and it will be appreciated that features of different embodiments may be combined with one another.

Embodiments of the present invention have been described, by way of example only, and many modifications or changes may be made to the embodiments and be within the scope of the appended claims. The features of the embodiments may be combined in any combination.

The invention claimed is:

1. A method of heating a wind turbine blade comprising a plurality of heating zones, the method comprising:
monitoring one or more environmental conditions or operating conditions;
determining an icing factor representing a severity of an icing event based on the one or more environmental conditions or operating conditions, and wherein a greater value of the icing factor on an icing factor scale indicates a greater severity of the icing event compared to a lesser value of the icing factor;
determining one or more heating zones to activate based on the determined icing factor, wherein each heating zone comprises one or more Electro-Thermal Heating Elements;
activating the one or more Electro-Thermal Heating Elements corresponding to the determined heating zones to generate heat, and
wherein the icing factor further comprises a first icing factor, a second icing factor, and a third icing factor, the second icing factor is less than the first icing factor and the third icing factor is less than the second icing factor,
wherein in response to determining that the icing factor changed from the first icing factor to the second icing factor, additional ones of the one or more Electro-Thermal Heating Elements are activated to increase a surface area of the wind turbine blade in which heat is generated, and
wherein in response to determining that the icing factor changed from the second icing factor to the third icing factor, additional ones of the one or more Electro-Thermal Heating Elements are activated to increase the surface area of the wind turbine blade in which heat is generated.

2. The method according to claim 1, in which the icing factor is further determined based on at least one of: ambient air temperature, liquid water content of air, wind speed, change in blade modal frequency, change in blade mass, or change in blade deflection.

3. The method according to claim 1 further comprising:
comparing the one or more environmental conditions or operating conditions to a threshold criteria; and
wherein determining the icing factor based on the environmental conditions is triggered in response to the threshold criteria being satisfied.

4. The method according to claim 3, further comprising:
overriding a determination to trigger determining the icing factor when wind conditions are below a cut-in wind speed for a wind turbine comprising the wind turbine blade.

5. The method according to claim 1, further comprising:
determining a duty cycle for activating the one or more Electro-Thermal Heating elements, based on the icing factor.

6. The method according to claim 5, further comprising:
identifying a percentage of the duty cycle for activating the one or more Electro-Thermal Heating elements for each of the heating zones.

7. The method according to claim 1, further comprising:
identifying, from the plurality of heating zones, a subset of heating zones that provides a greater aerodynamic performance based on the icing factor, wherein the greater aerodynamic performance varies along a length of a wind turbine blade, wherein the greater aerodynamic performance is a percentage contribution to power generated by a wind turbine.

8. A controller for controlling heating of a wind turbine blade comprising a plurality of heating zones, the controller being adapted to:
monitor one or more environmental conditions or operating conditions;
determine an icing factor representing a severity of an icing event based on the one or more environmental conditions or operating conditions of a wind turbine comprising the wind turbine blade, and wherein a greater value of the icing factor on an icing factor scale indicates a greater severity of the icing event compared to a lesser value of the icing factor;
determine heating zones to activate based on the icing factor, wherein each of the plurality of heating zones comprises one or more Electro-Thermal Heating elements;
activate the one or more Electro-Thermal Heating Elements corresponding to the determined heating zones to generate heat;
wherein the icing factor further comprises a first icing factor, a second icing factor, and a third icing factor, the second icing factor is less than the first icing factor and the third icing factor is less than the second icing factor, and
in response to determining that the icing factor changed from the first icing factor to the second icing factor, activate additional ones of the one or more Electro-Thermal Heating Elements to increase a surface area of the wind turbine blade in which heat is generated; and
in response to determining that the icing factor changed from the second icing factor to the third icing factor, activate additional ones of the one or more Electro-Thermal Heating Elements to increase the surface area of the wind turbine blade in which heat is generated.

9. The controller according to claim 8, in which the controller is adapted to determine the icing factor based on at least ambient air temperature, liquid water content of air and wind speed.

10. The controller according to claim 8, in which the controller is adapted to determine the icing factor continuously.

11. The controller according to claim 8, in which the controller is adapted to determine the icing factor at predetermined intervals.

12. The controller according to any one of claim 8 further adapted to:
monitor one or more environmental conditions or operating conditions;
compare the one or more environmental conditions or operating conditions to a threshold criteria; and wherein determining the icing factor based on the environmental conditions is triggered in response to trigger determining the icing factor in response to the threshold criteria being satisfied.

13. The controller according to claim 12, further adapted to:
override a determination to trigger determining the icing factor when measured wind conditions are below a cut-in wind speed for a wind turbine including the wind turbine blade.

14. The controller according to claim 8, further adapted to:
identify, from the plurality of heating zones, a subset of heating zones that provide a greater aerodynamic performance based on the icing factor.

15. The controller according to claim 8, further adapted to:
determine a duty cycle for activating the one or more Electro-Thermal Heating elements of the plurality of heating zones, based on the icing factor.

16. The controller according to claim 15, further adapted to:
identify a percentage of the duty cycle for activating the one or more Electro-Thermal Heating elements for each of the plurality of heating zones.

17. The controller according to claim 15, further adapted to:
activate the one or more Electro-Thermal Heating elements of the plurality of heating zones, based on the determined duty cycle.

18. The controller according to claim 8, wherein a single heating zone includes a plurality of non-adjacent regions of a surface of the wind turbine blade.

19. A wind turbine system comprising:
a wind turbine blade including a plurality of Electro-Thermal Heating elements embedded in the wind turbine blade;
a controller configured to:
monitor one or more environmental conditions or operating conditions;
determine an icing factor based on the one or more environmental conditions or operating conditions of a wind turbine comprising the wind turbine blade;
determine heating zones to activate based on the icing factor, wherein each of the heating zones comprises one or more of the plurality of Electro-Thermal Heating elements;
activate the Electro-Thermal Heating Elements corresponding to the determined heating zones to generate heat;
wherein the icing factor further comprises a first icing factor, a second icing factor, and a third icing factor, the second icing factor is less than the first icing factor and the third icing factor is less than the second icing factor, and
in response to determining that the icing factor changed from the first icing factor to the second icing factor, activate additional ones of the plurality of Electro-Thermal Heating Elements to increase a surface area of the wind turbine blade in which heat is generated; and
in response to determining that the icing factor changed from the second icing factor to the third icing factor, activate additional ones of the plurality of Electro-Thermal Heating Elements to increase the surface area of the wind turbine blade in which heat is generated.

20. The wind turbine system according to claim 19, wherein:
wherein in response to determining that the icing factor changed from both the first icing factor to the second icing factor and the second icing factor to the third icing factor, a percentage of available power supplied to the plurality of Electro-Thermal Heating elements remains constant,
wherein the icing factor further comprises a fourth icing factor and a fifth icing factor, the fifth icing factor is less than the fourth icing factor, and
wherein in response to determining that the icing factor changed from the fourth icing factor to the fifth icing factor, a percentage of available power supplied to the plurality of Electro-Thermal Heating elements decreases.

* * * * *